3,272,889
EPOXIDE COPOLYMERS
Edwin J. Vandenberg, Wilmington, Del., assignor to Hercules Incorporated, a corporation of Delaware
No Drawing. Filed May 27, 1964, Ser. No. 370,717
12 Claims. (Cl. 260—823)

This application is a continuation-in-part of my application U.S. Serial No. 812,079, filed May 11, 1959, and now U.S. Patent No. 3,135,705, which is a continuation-in-part of my application Serial No. 738,626, filed May 29, 1958, now abandoned.

This invention relates to new epoxide copolymers and, more particularly, to crystalline copolymers of cis-butene-2-oxide.

It is known that 1,2-alkylene oxides such as ethylene oxide, propylene oxide, and butylene oxide can be copolymerized with each other or other 1,2-alkylene oxides to produce resinous copolymers which are soluble or insoluble in water and have a wide spectrum of properties and characteristics. It is also known from my patent U.S. 3,065,187 that both the cis- and trans-butene-2-oxides, i.e., cis- and trans-2,3-epoxybutane, can be polymerized to yield crystalline homopolymers with outstanding properties.

Now, in accordance with this invention, it has been discovered that the cis-butene-2-oxide, i.e., cis-2,3-epoxybutane, can be copolymerized with a second epoxide monomer of the formula

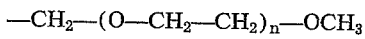

where Z and Z' are hydrogen or a radical

—CH$_2$—(O—CH$_2$—CH$_2$)$_n$—OCH$_3$ where $n$ is a number from 0 to 20, and when Z and Z' are —CH$_2$—(O—CH$_2$—CH$_2$)$_n$—OCH$_3$, the monomer has a cis configuration, to yield copolymers having a crystalline structure similar to the cis-2,3-epoxybutane homopolymer but having an increased degree of water absorptivity. This finding was most unexpected since it is not possible to copolymerize trans-2,3-epoxybutane with ethylene oxide and obtain a crystalline copolymer.

The new crystalline cis-butene-2-oxide copolymers of this invention are either random or block copolymers or mixtures of random and block copolymers and find use in a variety of applications, such as in films, fibers, and other plastic applications, and particularly where water absorption and permeability characteristics are important, such as in packaging film for meats and vegetables and in fabrics useful for bandages or wearing apparel such as raincoats, shoes, etc., and as fiber blends with water-insensitive fibers. They preferably will have a reduced specific viscosity (hereinafter referred to as RSV) of at least about 0.5, and most preferably at least about 1.0 (measured on a 0.1% solution in tetrachloroethane at 100° C.). Films and fibers are readily fabricated from such copolymers and have excellent physical properties which may be further greatly enhanced by orientation. Such films and fibers are not affected by heptane, benzene, alcohols, ketones, and the like at room temperature but are dissolved at 100–120° C. by chloroform, tetrachloroethane, and benzene. The copolymers have a fairly high moisture vapor transmission and water absorption coupled with excellent low temperature properties and good high temperature resistance.

The new copolymers of this invention can be prepared by contacting cis-butene-2-oxide and the above-defined epoxide with an alkylaluminum catalyst which has been prereacted or complexed with water within specified molar ranges and/or a complexing agent such as tetrahydrofuran or a chelating agent such as acetylacetone, as described in my copending application Serial No. 812,079, filed May 11, 1959, and now U.S. Patent No. 3,135,705. When water is used, the amount will usually be within the range of 0.5 to 1 mole of water per mole of alkylaluminum compound, but a ratio of from about 0.1:1 to about 2:1 can be used. The alkyl group of the alkylaluminum compound can be any alkyl, as, for example, methyl, ethyl, isopropyl, butyl, isobutyl, hexyl, octyl, etc.

The polymerization reaction can be carried out in bulk or in a solution or in a suspension in an inert organic diluent at any desired temperature and pressure. With a chelated aluminum alkyl-water reaction product as the catalyst, atmospheric or autogenous pressure will usually be used, and the reaction will generally be carried out at a temperature of from about −30° C. to about 150° C., preferably over 0° C., and more preferably above 30° C. Exemplary of the diluents that can be used are the ethers such as diethyl ether, dipropyl ether, etc., halogenated hydrocarbons such as chlorobenzene, methylene chloride, etc., or a hydrocarbon diluent such as n-heptane, cyclohexane, benzene, toluene, etc.

Another factor to be considered in the preparation of the new crystalline copolymers is the purity of the cis-butene-2-oxide monomer. It is important that not only the cis-butene-2-oxide monomer but also that the second epoxide monomer be essentially free of water, alcohols, and other contaminants reactive with the catalyst.

The epoxide monomer which is copolymerized with cis-2-butene-oxide has, as stated above, the formula

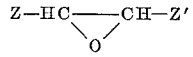
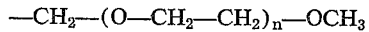

where Z and Z' are both selected from the group consisting of hydrogen and a radical —CH$_2$—(O—CH$_2$—CH$_2$)$_n$—OCH$_3$ when $n$ is a number from 0 to 20, provided that the latter monomer has a cis configuration. Preferred epoxide monomers include ethylene oxide, methyl glycidyl ether, cis-1,4-dimethoxy-2,3-epoxybutane, cis-1,4-bis(methoxyethoxy)-2,3-epoxybutane, and the like. The monomer can be introduced into the reaction medium in any way, i.e., stepwise or all at once, either before or after the cis-2-butene-oxide, so as to produce either random or block copolymers or mixtures of random and block copolymers. The amount of the copolymerizable epoxide monomer introduced into the copolymer will vary within relatively wide limits and will ordinarily comprise 1 to about 30%, preferably about 1 to about 20%, and more preferably about 2 to about 10%, by weight of the copolymer, provided, of course, that the copolymer still retains at least a partly crystalline structure on X-ray examination.

The following examples will illustrate the preparation of the new crystalline copolymers of this invention. All parts and percentages are by weight unless otherwise indicated. The molecular weight of the copolymers is shown by their reduced specific viscosity (RSV). The term "reduced specific viscosity" means the $\eta_{sp/c}$ as determined on a 0.1% solution of the copolymer in tetrachloroethane at 100° C., unless otherwise noted. If necessary, the polymer can be dissolved at somewhat higher temperatures (up to reflux temperature) and then cooled to 100° C. for the determination of RSV. Where the melting point of the copolymer is given, it was determined by differential thermal analysis, also referred to as DTA. The procedure for determining the melting point of a polymer by differential thermal analysis is described in Organic Analysis, vol. 4, by J. Mitchell et al., Interscience Publishers, New York, 1960. See particularly pages 372–383 of this reference. The crystallinity of the polymer was determined by X-ray diffraction and is designated as being L (low), M (moderate), or H (high).

EXAMPLES 1-2

In each of these examples a polymerization vessel with a nitrogen atmosphere was charged with n-heptane as diluent and 10 parts of a mixture of cis-butene-2-oxide (99.4% pure by gas chromatography; 0.01% $H_2O$) and ethylene oxide. After equilibrating at 30° C., a solution of the catalyst was injected into each vessel. The catalyst in Example 1 was prepared by diluting a 1.5 molar solution of triethylaluminum in n-heptane to 0.5 molar with ether, adding water while stirring in an amount equal to 0.5 mole per mole of aluminum dropwise over 15 minutes, adding 0.5 mole acetylacetone per mole of aluminum over 1 min. at 0° C. while stirring, and then agitating the catalyst mixture for 15 min. at 0° C. and then for 2 hrs. at room temperature. The catalyst solution for Example 2 was prepared by adding to an aliquot of the catalyst solution of Example 1, 1 mole of cyclohexanol per mole of aluminum at 0° C. agitating the catalyst mixture for 16 hours at 30° C., and then heating for 4 hours at 65° C. The polymerizations were carried out by agitating the mixture for 7-24 hrs. at 30° C. and then shortstopping by adding 4 parts anhydrous ethanol. The reaction mixture was diluted with sufficient diethyl ether to decrease the viscosity for ease in handling and was washed twice with 3% aqueous hydrochloric acid for 1 hr. with stirring and then washed neutral with water. The ether-insoluble fraction was collected, was washed twice with ether and once with 0.05% solution of 4,4'-thiobis(6-t-butyl-m-cresol) in ether, and was dried for 16 hrs. at 80° C. under vacuum. To the ether-soluble fraction there was added 0.5% 4,4'-thiobis(6-t-butyl-p-cresol), by weight of the polymer (assuming 20% conversion), the fraction evaporated to dryness, and the recovered polymer dried for 16 hrs. at 80° C. under vacuum. The ether-insoluble copolymers for Examples 1 and 2 were tough white solids. Carbon analysis of the copolymer of Example 2 indicated that it contained 12.8% ethylene oxide.

Films were also prepared from the ether-insoluble copolymer of these examples by compression molding the copolymer and then cooling to room temperature under pressure. The water absorptivity of these films was evaluated by determining the increase in weight of sample of the film after suspension in water for 24 hrs. at 25° C. and at 1° C. The water absorption at 1° C. was determined on the same specimen used in the 25° C. test.

In Table I are set forth details as to polymerization, conversion, and physical properties of the copolymers, as well as molding conditions and water absorptivity of films produced from the ether-insoluble copolymer of these examples.

*Table I*

|  | Example 1 | Example 2 |
|---|---|---|
| Monomer ratio (cis-butene-2-oxide:ethylene oxide) | 95:5 | 98:2 |
| Diluent (parts) | 81 | 23 |
| Catalyst (mmoles, aluminum basis) | 4 | 8 |
| Polymerization time (hrs.) | 7 | 24 |
| Total conversion (percent) | 25 | 31 |
| Ether-Soluble Polymer: |  |  |
|   Percent conversion | 22 | 31 |
|   RSV | [1] 4.2 | 0.48 |
|   Crystallinity | L |  |
| Ether-Insoluble Polymer: |  |  |
|   Percent conversion | 2.4 | 1.3 |
|   RSV | [1] 12 | 4.8 |
|   Crystallinity | M | M |
| Film: |  |  |
|   Molding conditions: |  |  |
|     Temp., °C | 155 | 175 |
|     Pressure (p.s.i.) | 100 | 100 |
|     Time (min.) | 4 | 4 |
|   Water absorption: |  |  |
|     25° C | 50 | [2] 26 |
|     1° C | 50 |  |
|   Description | (³) | (³) |

[1] Determined on a 0.1% solution in A-chloronaphthalene at 135° C.
[2] After correction for a 10.5% weight loss.
[3] Tough; flexible.

EXAMPLES 3-4

The following examples demonstrate the preparation of block copolymers in accordance with the invention.

The procedure of Example 1 was repeated except that instead of using a mixture of cis-butene-2-oxide and ethylene oxide, the ethylene oxide was added first, then the catalyst and the mixture was polymerized for 21 hrs. at 30° C., the cis-butene-2-oxide was added, and the polymerization was continued for an additional 19 hrs. at 30° C. After stopping the polymerization, the reaction product was treated with a 60:40:10 toluene:butanol:concentrated HCl mixture for 2-4 hrs. at 90° C., cooled to room temperature to induce crystallization, toluene added and the product washed neutral with water, and then separated into a toluene-soluble and insoluble fraction. The insoluble fraction was washed once with toluene and once with a 0.05% solution of 4,4'-thiobis(6-tert-butyl-m-cresol) in toluene. The soluble fraction was stabilized with 0.5% 4,4'-thiobis(6-tert-butyl-m-cresol) assuming 20% conversion. Both fractions were dried for 16 hrs. at 80° C. in an oil pump vacuum. The insoluble fractions produced were tough crystalline solids and were formed into films and evaluated as in Examples 1-2. Details as to polymerization, conversion, and polymer properties, as well as film properties and molding conditions, are recorded in Table II.

*Table II*

|  | Example 3 | Example 4 |
|---|---|---|
| Monomer ratio (cis-butene-2-oxide:ethylene oxide) | 95:5 | 98:2 |
| Diluent (parts) | 63 | 63 |
| Catalyst (mmoles, aluminum basis) | 4 | 4 |
| Total conversion (percent) | 20 | 57 |
| Soluble Polymer: |  |  |
|   Percent conversion | 9.0 | 36 |
|   RSV | 1.3 | 1.0 |
| Insoluble Polymer: |  |  |
|   Percent conversion | 10.6 | 20.6 |
|   RSV | 3.6 | 3.9 |
| Differential Thermal Analysis: |  |  |
|   Melting point (° C.) | 138 | 140 |
|   Area (sq. in.) | 1.06 | 0.78 |
| Film: |  |  |
|   Molding conditions: |  |  |
|     Temperature (° C.) | 135 | 135 |
|     Pressure (p.s.i.) | 100 | 200 |
|     Time (min.) | 5 | 2 |
|   Water absorption: |  |  |
|     Percent at 25° C | [1] 25 | [2] 4.8 |
|     Percent at 1° C | [1] 24 |  |
|   Description | (³) | (³) |

[1] After correction for a 5.6% weight loss.
[2] 5.6 after 72 hrs.
[3] Tough; flexible.

EXAMPLE 5

The procedure of Example 1 was repeated except that methyl glycidyl ether was substituted for the ethylene oxide and phenyl β-naphthylamine was used as an antioxidant in place of 4,4'-thiobis(6-tert-butyl-m-cresol). The isoluble copolymer was a tough, somewhat rubbery copolymer. Details of this run are tabulated below in Table III.

EXAMPLE 6

The procedure of Examples 3-4 was repeated except that methyl glycidyl ether was substituted for the ethylene oxide. The insoluble copolymer was a white solid. Details of this example and Example 5 are recorded in Table III.

Table III

| | Example 5 | Example 6 |
|---|---|---|
| Monomer ratio (cis-butene-2-oxide:methyl glycidyl ether) | 97:3 | 94:6 |
| Diluent (parts) | 63 | 63 |
| Catalyst (mmoles, aluminum basis) | 4 | 4 |
| Polymerization time (hrs.) | 6 | 40 |
| Total conversion (percent) | 41 | 32 |
| Soluble Polymer: | | |
| Percent conversion | 37 | 29 |
| RSV | 0.51 | 0.92 |
| Insoluble Polymer: | | |
| Percent conversion | 4.3 | 2.5 |
| RSV | 1.6 | 4.5 |
| Crystallinity | M | M |
| Differential Thermal Analysis: | | |
| Melting point (° C.) | 130 | 135 |
| Area (sq. in.) | 0.5 | 0.83 |
| Film: | | |
| Molding conditions: | | |
| Temperature (° C.) | 175 | 135 |
| Pressure (p.s.i.) | 100 | 0 |
| Time (min.) | 3 | 3 |
| Water absorption (percent): | | |
| 25° C | 13.4 | 39 |
| 1° C | 13.2 | 51 |
| Description | (¹) | (¹) |

¹ Tough; flexible.

EXAMPLE 7

The procedure of Example 1 was repeated except that cis-1,4-dimethoxy-2,3-epoxybutane was substituted for the ethylene oxide. The insoluble copolymer was a tough, crystalline solid which on molding gave a tough, flexible film having a water absorptivity of 30% after 24 hrs. in water at 25° C.

EXAMPLE 8

The procedure of Example 1 was repeated except that cis-1,4-bis(methoxy ethoxy)-2,3-epoxybutane was substituted for the ethylene oxide. The insoluble copolymer was a tough, white, crystalline solid which on molding gave a tough film that absorbed 50% water after 24 hrs. in water at 25° C.

What I claim and desire to protect by Letters Patent is:

1. A crystalline copolymer consisting of cis-butene-2-oxide and a second epoxide monomer of the formula

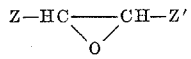

where Z and Z' are each selected from the group consisting hydrogen and a radical of the formula

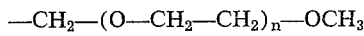

where $n$ is 0 or 1, and when Z and Z' are

the monomer has a cis configuration, said copolymer containing about 1% to about 30% of said second epoxide based on the weight of the copolymer.

2. The crystalline copolymer of claim 1 wherein the second epoxide is ethylene oxide.
3. The crystalline copolymer of claim 1 wherein the second epoxide is methyl glycidyl ether.
4. The crystalline copolymer of claim 1 wherein the second epoxide is cis-1,4-dimethoxy-2,3-epoxybutane.
5. The crystalline copolymer of claim 1 wherein the second epoxide is cis-1,4-bis(methoxy ethoxy)-2,3-epoxybutane.
6. A crystalline block copolymer consisting of a homopolymerized block of cis-butene-2-oxide linearly united to a homopolymerized block of a second epoxide monomer of the formula

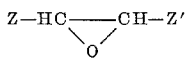

where Z and Z' are each selected from the group consisting of hydrogen and a radical of the formula

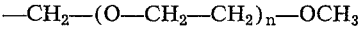

where $n$ is 0 or 1, and when Z and Z' are

the monomer has a cis configuration, said copolymer containing about 1% to about 30% of said second epoxide based on the weight of the copolymer.

7. The crystalline copolymer of claim 6 wherein the second epoxide is ethylene oxide.
8. The crystalline copolymer of claim 6 wherein the second epoxide is methyl glycidyl ether.
9. The crystalline copolymer of claim 6 wherein the second epoxide is cis-1,4-dimethoxy-2,3-epoxybutane.
10. The crystalline copolymer of claim 6 wherein the second epoxide is cis-1,4-bis(methoxy ethoxy)-2,3-epoxybutane.
11. The crystalline block copolymer of claim 6 wherein said copolymer contains about 1% to about 20% of said second epoxide.
12. A shaped article of the crystalline copolymer of claim 1.

References Cited by the Examiner

UNITED STATES PATENTS

| | | | |
|---|---|---|---|
| 2,706,181 | 4/1955 | Pruitt et al. | 260—2 |
| 3,029,216 | 4/1962 | Bailey et al. | 260—2 |
| 3,127,371 | 3/1964 | Garty et al. | 260—2 |
| 3,186,958 | 6/1965 | Kutner et al. | 260—2 |

FOREIGN PATENTS 1,303,465  8/1962  France.

SAMUEL H. BLECH, *Primary Examiner.*

WILLIAM H. SHORT, *Examiner.*

S. N. RICE, *Assistant Examiner.*